United States Patent
Ismael

(10) Patent No.: US 9,495,180 B2
(45) Date of Patent: Nov. 15, 2016

(54) OPTIMIZED RESOURCE ALLOCATION FOR VIRTUAL MACHINES WITHIN A MALWARE CONTENT DETECTION SYSTEM

(71) Applicant: FireEye, Inc., Milpitas, CA (US)

(72) Inventor: Osman Abdoul Ismael, Palo Alto, CA (US)

(73) Assignee: FireEye, Inc., Milpitas, CA (US)

( * ) Notice: Subject to any disclaimer, the term of this patent is extended or adjusted under 35 U.S.C. 154(b) by 388 days.

(21) Appl. No.: 13/892,193

(22) Filed: May 10, 2013

(65) Prior Publication Data

US 2014/0337836 A1     Nov. 13, 2014

(51) Int. Cl.
*G06F 9/455* (2006.01)
*G06F 21/56* (2013.01)
*G06F 9/50* (2006.01)

(52) U.S. Cl.
CPC ........... *G06F 9/455* (2013.01); *G06F 9/45558* (2013.01); *G06F 9/5011* (2013.01); *G06F 21/56* (2013.01); *G06F 21/566* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,440,723 A | 8/1995 | Arnold et al. | |
| 5,490,249 A | 2/1996 | Miller | |
| 5,657,473 A | 8/1997 | Killean et al. | |
| 5,842,002 A | 11/1998 | Schnurer et al. | |
| 5,978,917 A | 11/1999 | Chi | |
| 6,088,803 A | 7/2000 | Tso et al. | |
| 6,094,677 A | 7/2000 | Capek et al. | |
| 6,108,799 A | 8/2000 | Boulay et al. | |
| 6,118,382 A | 9/2000 | Hibbs et al. | |
| 6,269,330 B1 | 7/2001 | Cidon et al. | |

(Continued)

FOREIGN PATENT DOCUMENTS

| | | |
|---|---|---|
| GB | 2439806 | 1/2008 |
| GB | 2490431 A | 10/2012 |

(Continued)

OTHER PUBLICATIONS

IEEE Xplore Digital Library Sear Results for "detection of unknown computer worms", Http//ieeexplore.ieee.org/searchresult.jsp?SortField=Score&SortOrder=desc&ResultC . . . , (Accessed on Aug. 28, 2009).

(Continued)

*Primary Examiner* — Kenny Lin
(74) *Attorney, Agent, or Firm* — Rutan & Tucker, LLP

(57) ABSTRACT

According to one embodiment, a computerized method comprises operations of instantiating a first virtual machine instance and a second virtual machine instance to run concurrently with the first virtual machine instance. The first virtual machine instance provides a first virtual operating environment while the second virtual machine instance is adapted to share the resources allocated to the first virtual machine instance. The second virtual machine instance is further adapted to allocate additional resources upon conducting a Copy-On Write operation.

35 Claims, 8 Drawing Sheets

(56) References Cited

U.S. PATENT DOCUMENTS

| | | |
|---|---|---|
| 6,272,641 B1 | 8/2001 | Ji |
| 6,279,113 B1 | 8/2001 | Vaidya |
| 6,298,445 B1 | 10/2001 | Shostack |
| 6,357,008 B1 | 3/2002 | Nachenberg |
| 6,417,774 B1 | 7/2002 | Hibbs et al. |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Benett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,151,263 B1 * | 4/2012 | Venkitachalam ....... G06F 9/485 711/162 |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |

(56) References Cited

U.S. PATENT DOCUMENTS

| | | |
|---|---|---|
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,282 B1 | 11/2014 | Aziz et al. |
| 8,898,788 B1 | 11/2014 | Aziz et al. |
| 8,935,779 B2 | 1/2015 | Manni et al. |
| 8,984,638 B1 | 3/2015 | Aziz et al. |
| 8,990,939 B2 | 3/2015 | Staniford et al. |
| 8,990,944 B1 * | 3/2015 | Singh et al. .................. 726/24 |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,694 B2 | 8/2015 | Aziz et al. |
| 9,117,079 B1 | 8/2015 | Huang et al. |
| 9,118,715 B2 | 8/2015 | Staniford et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland, III |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | Van Der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |

(56) References Cited

U.S. PATENT DOCUMENTS

| | | |
|---|---|---|
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1* | 1/2008 | Aziz ................................ 726/3 |
| 2008/0028463 A1 | 1/2008 | Dagon et al. |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0127348 A1 | 5/2008 | Largman et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0163204 A1* | 7/2008 | Morgan et al. ................ 718/1 |
| 2008/0181227 A1 | 7/2008 | Todd |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0175070 A1* | 7/2010 | Baba ............................ 718/105 |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | Stahlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2011/0321040 A1* | 12/2011 | Sobel et al. ...................... 718/1 |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0216046 A1 | 8/2012 | McDougal et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |

(56) References Cited

U.S. PATENT DOCUMENTS

| | | |
|---|---|---|
| 2012/0330801 A1 | 12/2012 | McDougal et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097601 A1* | 4/2013 | Podvratnik et al. ............... 718/1 |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2014/0006734 A1* | 1/2014 | Li et al. ........................ 711/162 |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181975 A1 | 6/2014 | Spernow et al. |
| 2014/0328204 A1 | 11/2014 | Klotsche et al. |
| 2014/0337836 A1 | 11/2014 | Ismael |
| 2014/0351935 A1 | 11/2014 | Shao et al. |
| 2015/0096025 A1 | 4/2015 | Ismael |

FOREIGN PATENT DOCUMENTS

| | | |
|---|---|---|
| WO | WO-02/06928 | 1/2002 |
| WO | WO-02/23805 | 3/2002 |
| WO | WO 2007-117636 | 10/2007 |
| WO | WO-2007-117636 | 10/2007 |
| WO | WO-2008/041950 | 4/2008 |
| WO | WO-2011/084431 | 7/2011 |
| WO | 2011/12348 A1 | 9/2011 |
| WO | 2012/075336 A1 | 6/2012 |
| WO | WO-2012145066 | 10/2012 |
| WO | 2013/067505 A1 | 5/2013 |

OTHER PUBLICATIONS

AltaVista Advanced Search Results. "Event Orchestrator". Http://www.altavista.com/web/results?Itag=ody&pg=aq& aqmode=aqa=Event+Orchesrator . . . , (Accessed on Sep. 3, 2009).

AltaVista Advanced Search Results. "attack vector identifier". Http://www.altavista.com/web/results?Itag=ody&pg=aq& aqmode=aqa=Event+Orchestrator . . . , (Accessed on Sep. 15, 2009).

Cisco, *Configuring the Catalyst Switched Port Analyzer (SPAN)* ("Cisco"),(1992-2003).

Reiner Sailer, Enriquillo Valdez, Trent Jaeger, Roonald Perez, Leendert van Doorn, John Linwood Griffin, Stefan Berger., *sHype: Secure Hypervisor Approach to Trusted Virtualized Systems* (Feb. 2, 2005) ("Sailer").

Excerpt regarding First Printing Date for Merike Kaeo, *Designing Network Security* ("Kaeo"), (2005).

*The Sniffers's Guide to Raw Traffic* available at: yuba.stanford.edu/~casado/pcap/section1.html, (Jan. 6, 2014).

"Network Security: NetDetector—Network Intrusion Forensic System (NIFS) Whitepaper", "*NetDetector Whitepaper*"), (2003).

"Packet", *Microsoft Computer Dictionary*, Microsoft Press, (Mar. 2002), 1 page.

"When Virtual is Better Than Real", IEEEXplore Digital Library, available at, http://ieeexplore.ieee.org/xpl/articleDetails. jsp?reload=true&arnumber=990073, (Dec. 7, 2013).

Abdullah, et al., *Visualizing Network Data for Intrusion Detection*, 2005 IEEE Workshop on Information Assurance and Security, pp. 100-108.

Adetoye, Adedayo, et al., "Network Intrusion Detection & Response System", ("Adetoye"), Exhibit 1022, (Sep. 2003).

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", *Springer-verlag Berlin Heidelberg*, (2006), pp. 165-184.

Bayer, et al., "Dynamic Analysis of Malicious Code", *J Comput Virol*, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), Exhibit 1013, (Jun. 5, 2003).

Chaudet, C. , et al., "Optimal Positioning of Active and Passive Monitoring Devices", *International Conference on Emerging Networking Experiments and Technologies*, Proceedings of the 2005 ACM Conference on Emerging Network Experiment and Technology, CoNEXT '05, Touloussse, France, (Oct. 2005), pp. 71-82.

Cohen, M.I. , "PyFlag—An advanced network forensic framework", *Digital investigation 5*, Elsevier, (2008), pp. S112-S120.

Costa, M. , et al., "Vigilante: End-to-End Containment of Internet Worms", *SOSP '05*, Association for Computing Machinery, Inc., Brighton U.K., (Oct. 23-26, 2005).

Crandall, J.R. , et al., "Minos:Control Data Attack Prevention Orthogonal to Memory Model", *37th International Symposium on Microarchitecture*, Portland, Oregon, (Dec. 2004).

Deutsch, P. , ""Zlib compressed data format specification version 3.3" RFC 1950, (1996)".

Distler, "Malware Analysis: An Introduction", *SANS Institute InfoSec Reading Room*, SANS Institute, (2007).

Dunlap, George W. , et al., "ReVirt: Enabling Intrusion Analysis through Virtual-Machine Logging and Replay", *Proceeding of the 5th Symposium on Operating Systems Design and Implementation*, USENIX Association, ("Dunlap"), (Dec. 9, 2002).

Filiol, Eric , et al., "Combinatorial Optimisation of Worm Propagation on an Unknown Network", International Journal of Computer Science 2.2 (2007).

Goel, et al., *Reconstructing System State for Intrusion Analysis, Apr. 2008 SIGOPS Operating Systems Review*, vol. 42 Issue 3, pp. 21-28.

Hjelmvik, Erik , "Passive Network Security Analysis with NetworkMiner", *(IN)SECURE*, Issue 18, (Oct. 2008), pp. 1-100.

Kaeo, Merike , "Designing Network Security", ("Kaeo"), (Nov. 2003).

Kim, H. , et al., "Autograph: Toward Automated, Distributed Worm Signature Detection", *Proceedings of the 13th Usenix Security Symposium (Security 2004)*, San Diego, (Aug. 2004), pp. 271-286.

King, Samuel T., et al., "Operating System Support for Virtual Machines", ("King"), Exhibit 1029.

Krasnyansky, Max , et al., *Universal TUN/TAP driver*, available at https://www.kernel.org/doc/Documentation/networking/tuntap.txt (2002) ("Krasnyansky"), Exhibit 1027.

Kreibich, C. , et al., "Honeycomb-Creating Intrusion Detection Signatures Using Honeypots", *2nd Workshop on Hot Topics in Networks (HotNets-11)*, Boston, USA, (2003).

Kristoff, J. , "Botnets, Detection and Mitigation: DNS-Based Techniques", *NU Security Day*, (2005), 23 pages.

Liljenstam, Michael , et al., "Simulating Realistic Network Traffic for Worm Warning System Design and Testing", *Institute for Security Technology studies, Dartmouth College*, ("Liljenstam"), (Oct. 27, 2003).

(56) References Cited

OTHER PUBLICATIONS

Marchette, David J., "Computer Intrusion Detection and Network Monitoring: A Statistical Viewpoint", "Marchette"), (2001).
Margolis, P.E., "Random House Webster's 'Computer & Internet Dictionary 3rd Edition'", ISBN 0375703519, (Dec. 1998).
Moore, D., et al., "Internet Quarantine: Requirements for Containing Self-Propagating Code", *INFOCOM*, vol. 3, (Mar. 30-Apr. 3, 2003), pp. 1901-1910.
Morales, Jose A., et al., ""Analyzing and exploiting network behaviors of malware."", *Security and Privacy in Communication Networks*. Springer Berlin Heidelberg, 2010. 20-34.
Natvig, Kurt, "SandboxII: INTERNET", *Virus Bulletin Conference*, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In *Proceedings of the 12th Annual Network and Distributed System Security*, Symposium (NDSS '05), (Feb. 2005).
Newsome, J., et al., "Polygraph: Automatically Generating Signatures for Polymorphic Worms", In *Proceedings of the IEEE Symposium on Security and Privacy*, (May 2005).
Nojiri, D., et al., "Cooperation Response Strategies for Large Scale Attack Mitigation", *DARPA Information Survivability Conference and Exposition*, vol. 1, (Apr. 22-24, 2003), pp. 293-302.
Peter M. Chen, and Brian D. Noble, "When Virtual is Better Than Real, Department of Electrical Engineering and Computer Science", *University of Michigan* ("Chen").
Silicon Defense, "Worm Containment in the Internal Network", (Mar. 2003), pp. 1-25.
Singh, S., et al., "Automated Worm Fingerprinting", *Proceedings of the ACM/USENIX Symposium on Operating System Design and Implementation*, San Francisco, California, (Dec. 2004).
Spitzner, Lance, "Honeypots: Tracking Hackers", ("Spizner"), (Sep. 17, 2002).
Thomas H. Ptacek, and Timothy N. Newsham, "Insertion, Evasion, and Denial of Service: Eluding Network Intrusion Detection", *Secure Networks*, ("Ptacek"), (Jan. 1998).
Venezia, Paul, "NetDetector Captures Intrusions", *InfoWorld Issue 27*, ("Venezia"), (Jul. 14, 2003).
Whyte, et al., "DNS-Based Detection of Scanning Works in an Enterprise Network", *Proceedings of the 12th Annual Network and Distributed System Security Symposium*, (Feb. 2005), 15 pages.
Williamson, Matthew M., "Throttling Viruses: Restricting Propagation to Defeat Malicious Mobile Code", *ACSAC Conference*, Las Vegas, NV, USA, (Dec. 2002), pp. 1-9.
International Patent Application No. PCT/US2013/048739, Notification of Transmittal of the International Search Report and the Written Opinion of the International Searching Authority, or the Declaration, Patent Cooperation Treaty, mailed Feb. 21, 2014.
Adobe Systems Incorporated, "PDF 32000-1:2008, Document management—Portable document format—Part1:PDF 1.7", First Edition, Jul. 1, 2008, 756 pages.
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Cisco "Intrusion Prevention for the Cisco ASA 5500-x Series" Data Sheet (2012).
Clark, John, Sylvian Leblanc,and Scott Knight. "Risks associated with usb hardware trojan devices used by insiders." Systems Conference (SysCon), 2011 IEEE International. IEEE, 2011.
FireEye Malware Analysis & Exchange Network, Malware Protection System, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Idika et al., A-Survey-of-Malware-Detection-Techniques, Feb. 2, 2007, Department of Computer Science, Purdue University.
Isohara, Takamasa, Keisuke Takemori, and Ayuma Kubota. "Kernel-based behavior analysis for android malware detection." Computational intelligence and Security (CIS), 2011 Seventh International Conference on. IEEE, 2011.
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/
usenixsecurity12/sex12- -final107.pdf [retrieved on Dec. 15, 2014].
Mori, Detecting Unknown Computer Viruses, 2004, Springer-Verlag Berlin Heidelberg.
Oberheide et al., CloudAV.sub.—N-Version Antivirus in the Network Cloud, 17th USENIX Security Symposium USENIX Security '08 Jul. 28-Aug. 1, 2008 San Jose, CA.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Wahid et al., Characterising the Evolution in Scanning Activity of Suspicious Hosts, Oct. 2009, Third International Conference on Network and System Security, pp. 344-350.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

OPTIMIZED RESOURCE ALLOCATION FOR VIRTUAL MACHINES WITHIN A MALWARE CONTENT DETECTION SYSTEM

1. FIELD

Embodiments of the disclosure relate to the field of data security. More specifically, one embodiment of the disclosure relates to a system, apparatus and method that optimizes the allocation of resources used by multiple virtual machine instances operating within a malware content detection system.

2. GENERAL BACKGROUND

Over the last decade, malicious software (malware) has become a pervasive problem for Internet users. In some situations, malware is a program or file that is embedded within downloadable content and designed to adversely influence or attack normal operations of a computer. Examples of different types of malware may include bots, computer viruses, worms, Trojan horses, spyware, adware, or any other programming that operates within an electronic device (e.g. computer, tablet, smartphone, server, router, wearable technology, or other types of electronics with data processing capability) without permission by the user or an administrator.

For instance, content may be embedded with objects associated with a web page hosted by a malicious web site. By downloading this content, malware causing another web page to be requested from a malicious web site may be unknowingly installed on the computer. Similarly, malware may also be installed on a computer upon receipt or opening of an electronic mail (email) message. For example, an email message may contain an attachment, such as a Portable Document Format (PDF) document, with embedded executable malware. Also, malware may exist in files infected through any of a variety of attack vectors, which are uploaded from the infected computer onto a networked storage device such as a file share.

Over the past few years, various types of security appliances have been deployed at different segments of a network. These security appliances use virtual machines to uncover the presence of malware embedded within ingress content propagating over these different segments. However, given that each virtual machine (VM) needs to be allocated a large amount of memory for its virtual operations, conventional security appliances are limited as to the number of concurrently operating VMs for malware analysis due to the substantial and additional costs for increased memory.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
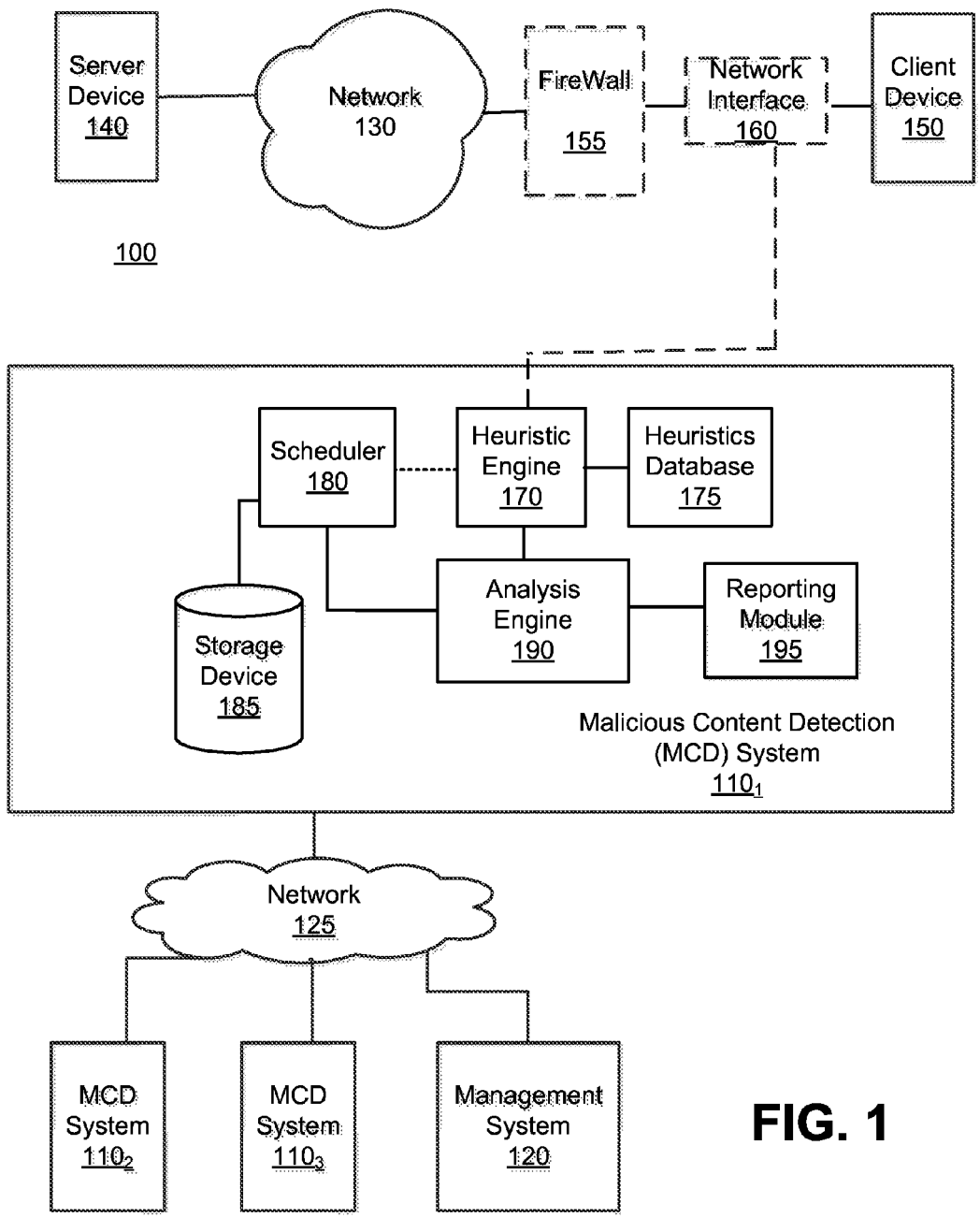
FIG. 1 is a first exemplary block diagram of a malware content detection (MCD) system with optimized resource allocation for multiple VMs deployed within a communication network.

Various embodiments of the disclosure relate to a malware content detection (MCD) system and a corresponding method for optimizing the number and configuration of virtual machine instances being concurrently executed for any given level of resources. This virtual machine (VM) optimization technique is directed to provisioning multiple VM instances that are based on the same software profile and are adapted to concurrently analyze the suspicious content for malware. This "software profile" includes information that is used for virtualization of an operating environment targeted to receive the suspicious content (e.g. guest operating system "OS" type and/or version; application type(s) and version(s); virtual device(s), etc.). The software profile is used to create the virtual operating environment for the VM instance.

The VM instances are instantiated as "VM clones," namely VM instances that are adapted to share system resources upon creation such as system memory and virtual disk space for example. These resources are allocated for virtualization of an operating environment having a particular software profile set to a prescribed virtual operating state. Hence, at instantiation, the VM clones associated with the particular software profile are placed into the same virtual operating state.

However, during execution and upon requiring resources different than those allocated, a VM clone may conduct a Copy-On Write (COW) operation, which causes allocation of different resources for use exclusively by that VM clone. At this time, the VM clone now becomes a unique VM instance although it may continue to use the shared resources other than the resource allocated for exclusive use through the COW operation. Hence, by VM instances sharing resources associated with the same software profile, a greater number of VM instances may be used concurrently (i.e. running at least in a partially overlapping manner) for malware analysis with minimal impact on memory capacity as only the different (non-shared) resources need to be allocated.

As an illustrative example, a first VM clone is instantiated by allocating resources (e.g., memory, virtual disk space, etc.) that support the running of the VM clone according to a particular software profile (e.g., guest OS: Windows® 7; application(s): Internet Explorer®, version 9) starting at a prescribed virtual operating state (e.g., after guest OS and web browser initialization). All other subsequent VM clones, which are instantiated while the first VM clone is running and based on the same particular software profile, are adapted to share identical resources allocated for the first VM clone. Hence, all of the VM clones are placed into an identical virtual operating state at instantiation.

During execution and upon requiring additional resources besides the allocated shared resources, the first VM clone conducts a Copy-On Write operation whereby additional resources are allocated (e.g., allocate one or more memory pages different than memory pages being part of the shared resources) that will be used exclusively by the VM instance that originated from the first VM clone. The same operations are applicable for other VM clones during execution.

More specifically, according to one embodiment of the invention, the VM optimization technique utilizes a VM profile database that comprises a number of VM disk files. Each VM disk file includes profile information that describes the configuration of the VM disk file. For example, the profile information may identify a particular software profile supported by the VM disk file, which may include the type and/or version of a guest OS along with at least one or more images of applications (and/or their corresponding version numbers). The VM disk file further includes VM state information that may be the results of a VM snapshot to capture the state, disk data and a configuration of the VM at a specific point in time (i.e. at a prescribed virtual operating state).

When two or more VM instances based on the same software profile are needed to conduct dynamic analysis on "suspicious" content from different data flows for example, the VM disk file supporting that software profile is selected from which these VM clones are instantiated. Contrary to current VM deployment, the VM clones share the same resources during execution and utilize Copy-On-Write functionality to customize their configuration so that the resultant VM instances may run concurrently while minimizing the amount of memory needed for support of these multiple VM instances.

I. TERMINOLOGY

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but is not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine) may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "content" generally refers to information transmitted as one or more messages, where each message(s) may be in the form of a packet, a frame, an Asynchronous Transfer Mode "ATM" cell, or any other series of bits having a prescribed format. The content may be received as a data flow, namely a group of related messages, within ingress data traffic.

Herein, content may include one or more types of data such as text, software, images, audio, metadata and/or other digital data. One example of content may include web content, or any data traffic that may be transmitted using a Hypertext Transfer Protocol (HTTP), Hypertext Markup Language (HTML) protocol, or may be transmitted in a manner suitable for display on a Web browser software application.

Another example of content includes electronic mail (email), which may be transmitted using an email protocol such as Simple Mail Transfer Protocol (SMTP), Post Office Protocol version 3 (POPS), or Internet Message Access Protocol (IMAP4). A further example of content includes an Instant Message, which may be transmitted using Session Initiation Protocol (SIP) or Extensible Messaging and Presence Protocol (XMPP) for example. Yet another example of content includes one or more files that are transferred using a data transfer protocol such as File Transfer Protocol (FTP) for subsequent storage on a file share.

The term "malware" is directed to software that produces an undesired behavior upon execution, where the behavior is deemed to be "undesired" based on customer-specific rules, manufacturer-based rules, any other type of rules formulated by public opinion or a particular governmental or commercial entity, or an indication of a potential exploit in a particular software profile. This undesired behavior may include a communication-based anomaly or an execution-based anomaly that (1) alters the functionality of an electronic device executing an application software in a malicious manner; (2) alters the functionality of an electronic device executing that application software without any malicious intent; and/or (3) provides an unwanted functionality which is generally acceptable in other context.

The term "transmission medium" is a communication path between two or more systems (e.g. any electronic devices with data processing functionality such as, for example, a security appliance, server, mainframe, computer, netbook, tablet, smart phone, router, switch, bridge or brouter). The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

In general, a "virtual machine (VM) instance" is a simulation of an electronic device (abstract or real) that is usually different from the electronic device conducting the simulation. VM instances may be based on specifications of a hypothetical computer or emulate the computer architecture and functions of a real world computer. A VM instance can be one of many different types such as, for example, hardware emulation, full virtualization, para-virtualization, and/or operating system-level virtualization virtual machines.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. GENERAL ARCHITECTURE

Referring to FIG. 1, an exemplary block diagram of a communication system 100 deploying a plurality of malware content detection (MCD) systems $110_1$-$110_N$ (N>1, e.g. N=3) communicatively coupled to a management system 120 via a network 125 is shown. In general, management system 120 is adapted to manage MCD systems $110_1$-$110_N$. For instance, management system 120 may be adapted to cause malware signatures generated as a result of malware detection by any of MCD systems $110_1$-$110_N$ to be shared with one or more of the other MCD systems $110_1$-$110_N$ including, for example, where such sharing is conducted on a subscription basis.

Herein, according to this embodiment of the invention, first MCD system $110_1$ is an electronic device that is adapted to (i) intercept data traffic that is routed over a communication network 130 between at least one server device 140 and at least one client device 150 and (ii) monitor, in real-time, content within the data traffic. More specifically, first MCD system $110_1$ may be configured to inspect content received via communication network 130 and identify "suspicious" content. The incoming content is identified as "suspicious" when it is assessed, with a certain level of likelihood, that at least one characteristic identified during inspection of the content indicates the presence of malware.

Thereafter, the suspicious content is further analyzed within a virtual machine (VM) execution environment to detect whether the suspicious content includes malware. The VM execution environment may comprise multiple VM instances supporting the same software profile, especially where the suspicious content is detected within multiple data flows within data traffic directed to the same targeted operating environment. These VM instances are instantiated as "VM clones," namely VM instances with read-only access to shared resources that are allocated to support a particular software profile at a prescribed virtual operating state. Hence, all of the VM clones support the same software profile and are placed in an identical state at initial runtime.

However, as one of the VM clones executes and requires modification of the resources (e.g. write to particular memory page), that VM instance performs Copy-On Write operations to create additional resources that are accessible only to that VM. Hence, as an illustrative example, the total amount of allocated memory needed to support the multiple VM instances is minimized to be equal to the amount of shared system resources allocated to support the software profile along with the additional resources exclusively required by each of the multiple VM instances.

According to this embodiment of communication system 100, first MCD system $110_1$ may be a web-based security appliance that is configured to inspect ingress data traffic, identify whether content associated with the data traffic may include malware, and if so, conduct a deeper analysis of the content. This deeper analysis is conducted in the VM instances within the VM execution environment to detect undesired behaviors that would be present if the data traffic were actually processed by an electronic device. The particulars of this analysis are described below.

The communication network 130 may include a public computer network such as the Internet, in which case an optional firewall 155 (represented by dashed lines) may be interposed between communication network 130 and client device 150. Alternatively, the communication network 130 may be a private computer network such as a wireless telecommunication network, wide area network, or local area network, or a combination of networks.

The first MCD system $110_1$ is shown as being coupled with the communication network 130 (behind the firewall 155) via a network interface 160. The network interface 160 operates as a data capturing device (referred to as a "tap" or "network tap") that is configured to receive data traffic propagating to/from the client device 150 and provide content from the data traffic to the first MCD system $110_1$.

In general, the network interface 160 receives and copies the content that is received from and provided to client device 150 normally without an appreciable decline in performance by the server device 140, the client device 150, or the communication network 130. The network interface 160 may copy any portion of the content, for example, any number of data packets.

In some embodiments, the network interface 160 may capture metadata from data traffic intended for client device 150, where the metadata is used to determine whether the data traffic includes any suspicious content as well as the software profile for such content. The metadata may be associated with the server device 140 and/or the client device 150. In other embodiments, a heuristic module 170 (described herein) may determine the software profile by analyzing the content associated with the data traffic.

It is contemplated that, for any embodiments where the first MCD system $110_1$ is implemented as an dedicated appliance or a dedicated computer system, the network interface 160 may include an assembly integrated into the appliance or computer system that includes network ports, network interface card and related logic (not shown) for connecting to the communication network 130 to non-disruptively "tap" data traffic propagating through firewall 155 and provide a copy of the data traffic to the heuristic module 170. In other embodiments, the network interface 160 can be integrated into an intermediary device in the communication path (e.g. firewall 155, router, switch or other network device) or can be a standalone component, such as an appropriate commercially available network tap. In virtual environments, a virtual tap (vTAP) can be used to copy traffic from virtual networks.

Referring still to FIG. 1, first MCD system $110_1$ may include a heuristic engine 170, a heuristics database 175, a scheduler 180, a storage device 185, an analysis engine 190 and a reporting module 195. In some embodiments, the network interface 160 may be contained within the first MCD system $110_1$. Also, heuristic engine 170, scheduler 180 and/or analysis engine 190 may be software modules executed by a processor that receives the suspicious content, performs malware analysis and is adapted to access one or more non-transitory storage mediums operating as heuristic database 175, storage device 185 and/or reporting module 195. In some embodiments, the heuristic engine 170 may be one or more software modules executed by a processor, and the scheduler 180 and the analysis engine 190 may be one or more software modules executed by a different processor, where the two processors are possibly located at geographically remote locations, and communicatively coupled for example via a network.

In general, the heuristic engine 170 serves as a filter to permit subsequent malware analysis only on a portion of incoming content, which effectively conserves system resources and provides faster response time in determining the presence of malware within analyzed content. As an ancillary benefit, by analyzing only the portion of incoming content that may have "exploits" (i.e. portions of content that may be exploited by malware), a greater number of VMs may be supported to run concurrently with each other.

As illustrated in FIG. 1, the heuristic engine 170 receives the copy of incoming content from the network interface 160 and applies heuristics to determine if any of the content is "suspicious". The heuristics applied by the heuristic engine 170 may be based on data and/or rules stored in the heuristics database 175. Also, the heuristic engine 170 may examine the image of the captured content without executing or opening the captured content.

For example, the heuristic engine 170 may examine the metadata or attributes of the captured content and/or the code image (e.g., a binary image of an executable) to determine whether a certain portion of the captured content matches or has a high correlation with a predetermined pattern of attributes that is associated with a malicious attack. According to one embodiment of the disclosure, the heuristic engine 170 flags content from one or more data flows as suspicious after applying this heuristic analysis.

Thereafter, according to one embodiment of the invention, the heuristic module 170 may be adapted to transmit at least a portion of the metadata or attributes of the suspicious content, which identify attributes of the client device 150, to the analysis engine 190. Such metadata or attributes are used to identify the VM instance needed for subsequent malware analysis and formulate software profile information for requesting a corresponding VM clone. In another embodiment of the disclosure, the analysis engine 190 may be adapted to receive one or more messages (e.g. data packets) from the heuristic engine 170 and analyze the message(s) to identify the software profile information associated with the needed VM instance.

For instance, as an illustrative example, the suspicious content under test may include an email message that was generated, under control of Windows® 7 Operating System, using a Windows® Outlook 2007, version 12. The email message further includes a Portable Document Format (PDF) attachment in accordance with Adobe® Acrobat®, version 9.0. Upon determining that the email message includes suspicious content, heuristic engine 170 provides software profile information to identify a particular type of VM instance needed to conduct dynamic analysis of the suspicious content. According to this illustrative example, the software profile information would include (1) Windows® 7 Operating System (OS); (2) Windows® Outlook 2007, version 12; and (3) PDF support through Adobe® Acrobat®, version 9.0.

The analysis engine 190 supplies the software profile information to the scheduler 180, which conducts a search as to whether any of the VM disk files within storage device 185 feature a software profile supporting the above-identified OS and one or more applications. If so and if a VM instance based on the software profile is already running, the scheduler 180 uses the same image used initially to create the VM instance to create a VM clone. Hence, the VM instance and the VM clone are members of the same VM family. In accordance with the illustrated example described above, the VM clone would support execution of a virtual device that is adapted to receive, open and process the email attachment. The VM clone is uploaded to the analysis engine 190 to analyze the suspicious content.

However, if the storage device 185 feature a software profile supporting the above-identified OS and one or more applications but there is no corresponding VM instance currently running, the scheduler 180 obtains an image associated with that software profile from VM provisioning logic (described below). This image may be subsequently used for VM clone generation. Of course, it is contemplated that if the storage device 185 does not feature a software profile supporting the above-identified OS/application(s) and no corresponding VM instance is currently running, the scheduler 180 may simply ignore the VM request or may receive an VM image from the VM provisioning logic that is based on a similar software profile. For example, the scheduler 180 may receive a VM instance based on the same OS but a different version of a targeted application. Alternatively, the scheduler 180 may receive the same OS along with an application different from the targeted application but having similar functionality (e.g. different type of browser, etc.). As another alternative, the scheduler 180 may receive a different OS with a similar architecture.

The scheduler 180 may retrieve and configure a VM clone to mimic the pertinent performance characteristics of the client device 150. In one example, the scheduler 180 may be adapted to configure the characteristics of the VM clone to mimic only those features of the client device 150 that are affected by the data traffic copied by the network interface 160. The scheduler 180 may determine the features of the client device 150 that are affected by the content by receiving and analyzing the data traffic from the network interface 160. Such features of the client device 150 may include ports that are to receive the content, certain device drivers that are to respond to the content, and any other devices coupled to or contained within the client device 150 that can respond to the content.

In another embodiment of the disclosure, the heuristic engine 170 may determine the features of the client device 150 that are affected by the data traffic by receiving and analyzing the content from the network interface 160. The heuristic engine 170 may then transmit the features of the client device to the scheduler 180 and/or analysis engine 190.

For instance, according to one embodiment of the disclosure, it is contemplated that the heuristic engine 170 may be adapted to transmit the metadata identifying the client device 150 to the analysis engine 190, where such metadata is used to identify the desired software profile. Alternatively, the analysis engine 190 may be adapted to receive one or more data packets of a data flow from the heuristic engine 170 and analyze the one or more data packets to identify the software profile. In yet other embodiment of the disclosure, the scheduler 180 may be adapted to receive software profile information, in the form of metadata or data packets, from the network interface 160 or from the heuristic module 170 directly.

The storage device 185 may be configured to store one or more VM disk files forming a VM profile database, where each VM disk file is directed to a different software profile for a VM instance. In one example, the VM profile database may store a VM disk file associated with a single VM instance that can be configured by the scheduler 180 to mimic the performance of a client device 150 on the communication network 130. Alternatively, as shown in FIG. 1, the VM profile database may store a plurality of VM disk files, where each VM disk file includes information associated with a distinct "family" of running VMs. Hence, these VM disk files are provided to simulate the performance of a wide variety of client devices 150.

The analysis engine 190 is adapted to execute multiple VM instances, including as one or more VM clones, to simulate the receipt and/or execution of different data flows of "suspicious" content by the client device 150 as well as different operating environments. Furthermore, the analysis engine 190 analyzes the effects of such content upon the client device 150. The analysis engine 190 may identify the effects of malware by analyzing the simulation of the effects of the content upon the client device 150 that is carried out on each VM instance. Such effects may include unusual network transmissions, unusual changes in performance, and the like. This detection process is referred to as a dynamic malicious content detection.

The analysis engine 190 may flag the suspicious content as malware according to the observed behavior of the VM instance. The reporting module 195 may issue alerts indicating the presence of malware, and using pointers and other reference information, identify what message(s) (e.g. packet(s)) of the "suspicious" content may contain malware. Additionally, the server device 140 may be added to a list of malicious network content providers, and future network transmissions originating from the server device 140 may be blocked from reaching their intended destinations, e.g., by firewall 155.

Figure 2:
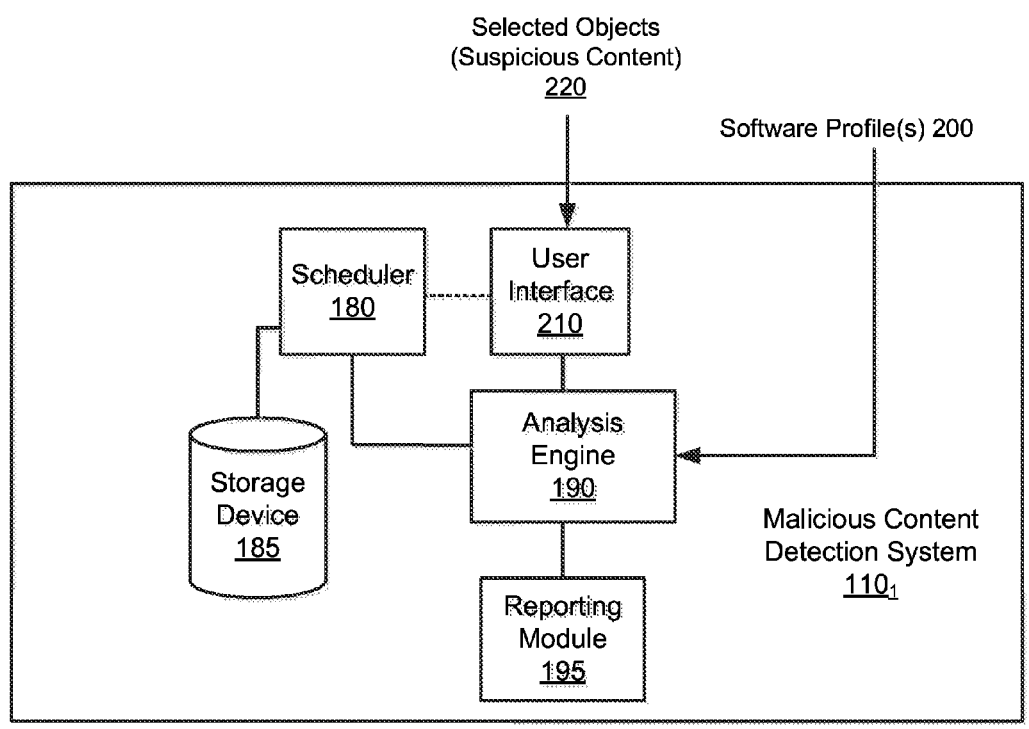
FIG. 2 is a second exemplary block diagram of the MCD system of FIG. 1.

Referring now to FIG. 2, a second exemplary embodiment of MCD system $110_1$ is shown, where the software profile for VM instantiation is not determined through analysis of suspicious content (e.g. metadata, data packets, binary, etc.) by the network interface 160, heuristic engine 170, or analysis engine 190. Rather, the software profile 200 is uploaded by the user and/or network administrator in order to control instantiation of VM clones that share resources and operate at a particular operating state.

More specifically, a user interface 210 allows the user or network administrator (hereinafter referred to as "user/administrator") to introduce objects 220 of the suspicious content in accordance with one or more prescribed software profiles 200. The software profile(s) 200 may be preloaded or selected by the user/administrator in order to generate one or more VM instances based on operations of the scheduler 180 and storage device 185 as described above. The VM instances perform dynamic analysis of the objects 220 to uncover undesired behavior during virtual execution of these objects 220 within the VM instances.

III. EXEMPLARY EMBODIMENT OF MCD SYSTEM CONFIGURATION

Figure 3:
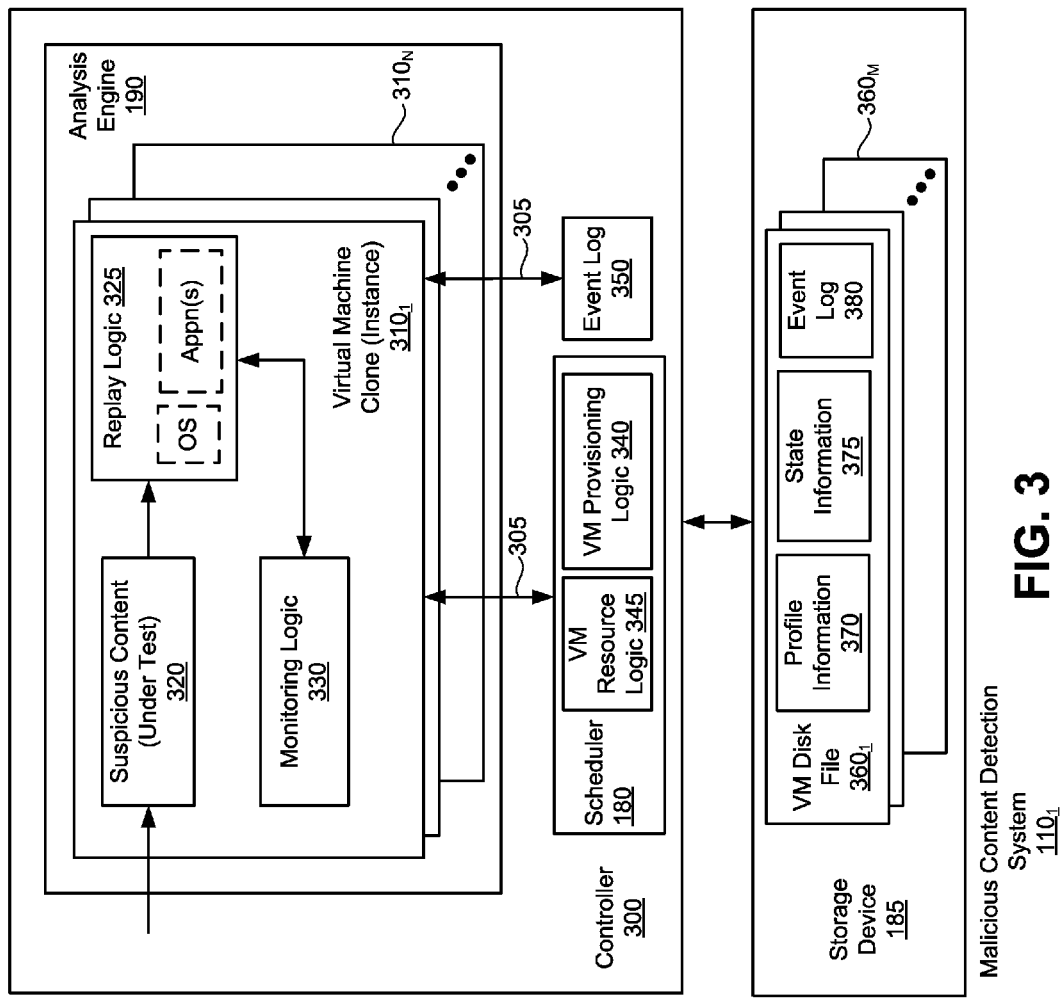
FIG. 3 is a detailed exemplary block diagram of the MCD system of FIG. 1.

Referring now to FIG. 3, a detailed block diagram of the MCD system $110_1$ according to one embodiment of the invention is shown. Herein, the MCD system $110_1$ comprises the storage device 185 coupled to a controller (data processing circuitry) 300 via a transmission medium 305. Controller 300 is configured to manage and/or control one or more virtual machine (VM) instances $310_1$-$310_N$ (N≥1) operating within analysis engine 190. Information associated with VM instances $310_1$-$310_N$ is stored in storage device 185 in a form of VM disk files $360_1$-$360_N$ (N≥M≥1).

Herein, controller 300 may be implemented as part of a VM monitor or manager (VMM), also referred to as a hypervisor for managing or monitoring VM instances, which may be hosted by a host operating system (OS). The VM instance(s) $310_1$-$310_N$ may be hosted by a guest OS. The host OS and the guest OS may be the same type of operating systems or different types of operating systems (e.g., Windows™, Linux™, Unix™, Mac OS™, iOS™, etc.) or different versions thereof.

It is contemplated that multiple VM instances $310_1$-$310_i$ (1≤i≤N) may concurrently perform malware analysis on a first content. According to one embodiment of the disclosure, each of these multiple VM instances $310_1$-$310_i$ may be based on substantially similar software profiles (e.g. VMs with same OS and/or application types but different OS version number; VMs with same OS and one or more application types with different version numbers; etc.). Additionally, these multiple VM instances $310_1$-$310_i$ may concurrently perform malware analysis on a second content. Thus, content may be analyzed in one VM instance for a plurality of VM families. Such analysis provides a mechanism to check software vulnerability in different OS and application versions, including patched versions. Of course, it is further contemplated that content may be analyzed in accordance with a single VM family featuring multiple VM instances.

As shown in FIG. 3, each VM disk file (e.g., VM disk file $360_1$) comprises read-only information, including (i) profile information 370 and (ii) state information 375, along with a persistent event log 380. Event log 380 is adapted to persistently store certain events or activities associated with undesired behaviors for suspicious content 320 during execution of VM clone $310_1$ and any other VM instances based on the software profile 370.

Herein, as illustrated, profile information 370 includes information directed to identified items forming the software profile within VM disk file $360_1$ from which a corresponding VM clone is instantiated. Examples of items within the software profile may include, but are not limited or restricted to a particular OS type/version; type(s)/version(s) of application(s); an amount of requisite memory for a VM instance corresponding to the VM disk file; and/or information for particular virtual devices capable of being supported by the corresponding VM instance.

State information 375 includes states based on a snapshot of the OS, application(s) and/or virtual device(s) after initialization and upon placement into a particular virtual operating state. The state information 375 enables each of the VM clones to be placed into an identical, prescribed virtual operating state from which additional resources are allocated as the VM clone transitions into a VM instance.

According to one embodiment of the invention, when suspicious content 320 is received for dynamic analysis (as opposed to static analysis conducted by heuristic engine 170), scheduler 180 of controller 300 is configured to identify and select one or more VM instances $310_1$-$310_N$ to closely simulate a targeted operating environment in which the suspicious content 320 is to be analyzed. The targeted operating environment is identified by software profile information (e.g., particular versions of OS and application images along with information directed to the virtual device states).

More specifically, the scheduler 180 comprises VM provisioning logic 340 and VM resource logic 345. VM provisioning logic 340 is responsible for creating VM clones and monitoring the number of VM instances concurrently utilized within the MCD system $110_1$ to ensure that the number of VM instances do not exceed a predetermined VM threshold. The predetermined VM threshold is based on a predetermined amount of resources (e.g., amount of memory) that may be allocated for use by concurrently operating VMs. For example, when the VM instances are based on a small number (M) of software profiles (e.g., less than 10 software profiles), a greater number of VM instances may be supported by the MCD system $110_1$ (i.e. VM threshold would have a first value). The reason is that, given the low number of software profiles needed, many of these VM instances are instantiated as VM clones which share a substantial portion of the same resources allocated for use by other VM instance(s). Likewise, when the VM instances are based on a larger number of different software profiles (e.g., M≥15), a lesser number of VM instances may be supported (i.e. VM threshold would have a second value less than the first value). Once the VM threshold is reached, the malware analysis testing may be delayed and the incoming content queued until the number of VMs falls below the VM threshold. At that time, the VM provisioning logic 340 is permitted to continue provisioning VM clones.

For VM clone generation, when suspicious content is to be dynamically analyzed, the VM provisioning logic 340 initially determines whether a VM instance having a particular software profile corresponding to the targeted operating environment for the suspicious content is running. The VM instance may be currently operating as a VM clone based on the particular software profile or formerly operated as the VM clone (i.e. additional resources have been allocated for that VM instance). If the VM instance having the particular software profile is running, the VM provisioning logic 340 instantiates a VM clone and no further allocation of resources is necessary at this time. Otherwise, the VM provisioning logic 340 allocates resources in accordance with the VM disk file $360_i$ (1≤i≤M) associated with the particular software profile.

VM resource logic 345 operates as the centralized logic within the MCD system for responding to resource requests, allocating resources and restoring state, and monitoring the allocation of such resources. More specifically, the VM resource logic 345 is adapted to maintain locations in memory for additional resources allocated for Copy-On Write operations performed by each VM instance $310_1$-$310_N$ including clones. More specifically, each VM clone for a given software profile shares the same allocated resources. As the VM clone requires additional resources, VM resource logic 345 allocates the requisite resources (e.g., certain memory page(s)) to that VM clone. Upon resource allocation, the VM resource logic 345 stores addressing information associated with the allocated resource along with an identifier assigned to that VM instance within a memory allocation table.

Upon receipt of one or more VM images corresponding to a particular software profile by the analysis engine 190, the scheduler 180 launches a VM clone $310_1$ in which a monitoring module 330 is running therein. The monitoring module 330 is configured to monitor activities and behavior of suspicious content 320 and to determine if the incoming content includes malware and whether the particular software profile features any vulnerabilities that are being exploited by malware. In addition, monitoring module 330 maintains a persistent communication channel with event log 350 of controller 300 to communicate certain events or activities of suspicious content 320 during execution of VM clone $310_1$.

In response to detecting certain undesired behaviors during processing of suspicious content 320, the replay logic 325 now identifies the presence of malware within the content 320 and potential exploits in the particular software profile. Thereafter, monitoring module 330 is configured to send a message via the communication channel to event log 350, where the message may be forwarded via transmission medium 305 for persistently recordation as part of event log 380. The message may include information identifying an event triggered by the suspicious content 320. Event log 350 records events that have been selectively monitored and detected by monitoring module 330, including undesired behaviors. The recordation of the events may be prompted in response to a particular action or inaction (e.g., file creation, registry access, DLL loading, process execution, power management such as sleep). The recorded events may be subsequently analyzed by analysis engine 190 based on a set of rules or policies to determine whether suspicious content 320 includes malware or has a high likelihood of including malware.

IV. EXEMPLARY EMBODIMENTS COPY-ON-WRITE OPERATIONS

Figure 4:
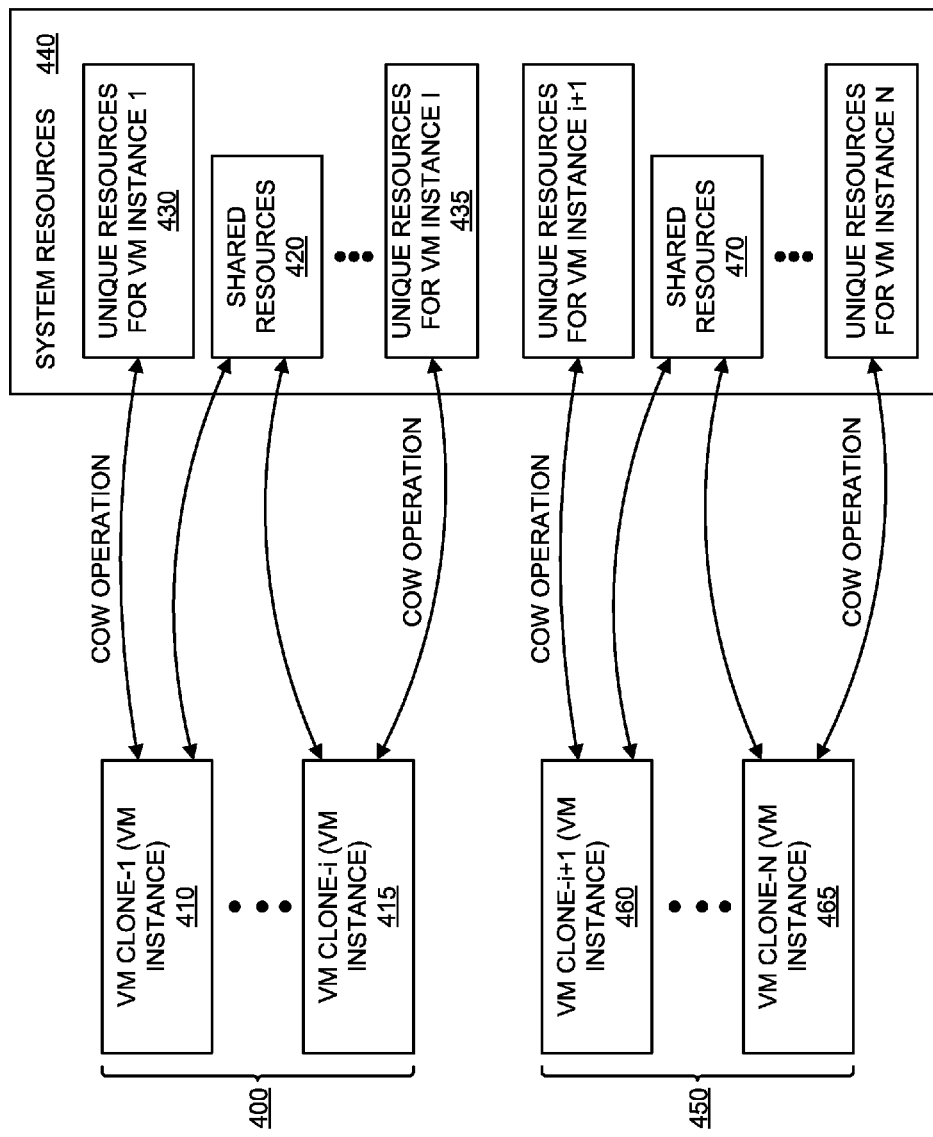
FIG. 4 is an exemplary block diagram illustrating Copy-On Write (COW) operations conducted for each family of VM clones.
Figure 5:
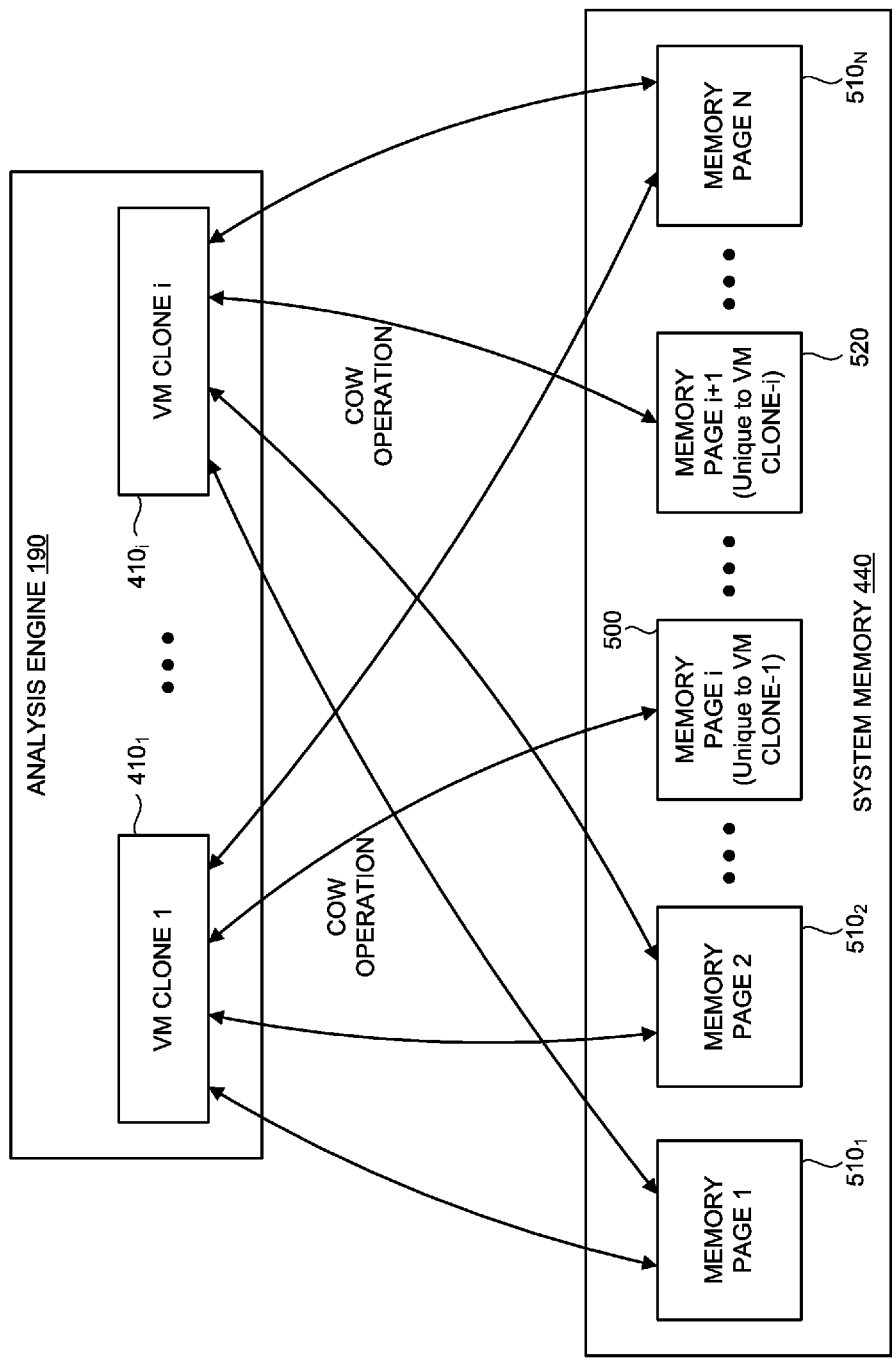
FIG. 5 is an exemplary block diagram illustrating Copy-On Write (COW) operations conducted for a particular family of VM clones.

Referring to FIGS. 4 and 5, block diagrams illustrating Copy-On Write (COW) operations conducted for each family of VM clones and VM clones within a particular family is shown. Herein, as shown in FIG. 4, a first family of VM clones 400 is instantiated according to a first software profile while a second family of VM clones 450 is instantiated according to a second software profile. In other words, the first family of VM clones 400 comprises a set of VM clones, namely one or more VM clones, such as VM clones 410 and 415 which are adapted to access shared resources 420 within system resources 440. The shared resources 420 include data within a predetermined area of system resources 440 that provides data for virtualization of a particular OS, prescribed applications, hardware devices (e.g., ports, etc.) directed to a first software profile. The shared resources 420 are at least partially used by VM clones 410 and 415 for dynamic analysis of suspicious content for malware.

As VM clone-1 410 (VM instance) runs and requires additional or altered resources than provided by shared resources 420, VM clone-1 410 is allocated additional resources 430, which may be accomplished by conducting write operations into one or more pages 500 of system resources 440 that are different from memory pages 510 associated with shared resources 420 as shown in FIGS. 4 and 5. The memory pages 500 can be subsequently accessed by VM clone-1 410 during malware analysis. Furthermore, as VM clone-i 415 (VM instance) runs and requires additional or altered resources than provided by shared resources 420, VM clone-i 415 is allocated additional resources 435 by conducting write operations into one or more pages 520 of system resources 440 that are different from memory pages 510 associated with shared resources 420 as also shown in FIGS. 4 and 5.

Referring back to FIG. 4, a second family of VM clones 450 has a similar configuration, where second family of VM clones 450 comprises at least two VM clones 460 and 465 each having access to shared resources 470 within the system resources 440, where shared resources 470 are different than shared resource 420. The shared resources 470 include data within a predetermined area within system resources 440 that provides data for virtualization of a particular OS, prescribed applications, hardware devices (e.g., ports, etc.) associated with a second software profile different than the first software profile (e.g., different OS type).

V. VM INSTANCE OPTIMIZATION

Figure 6:
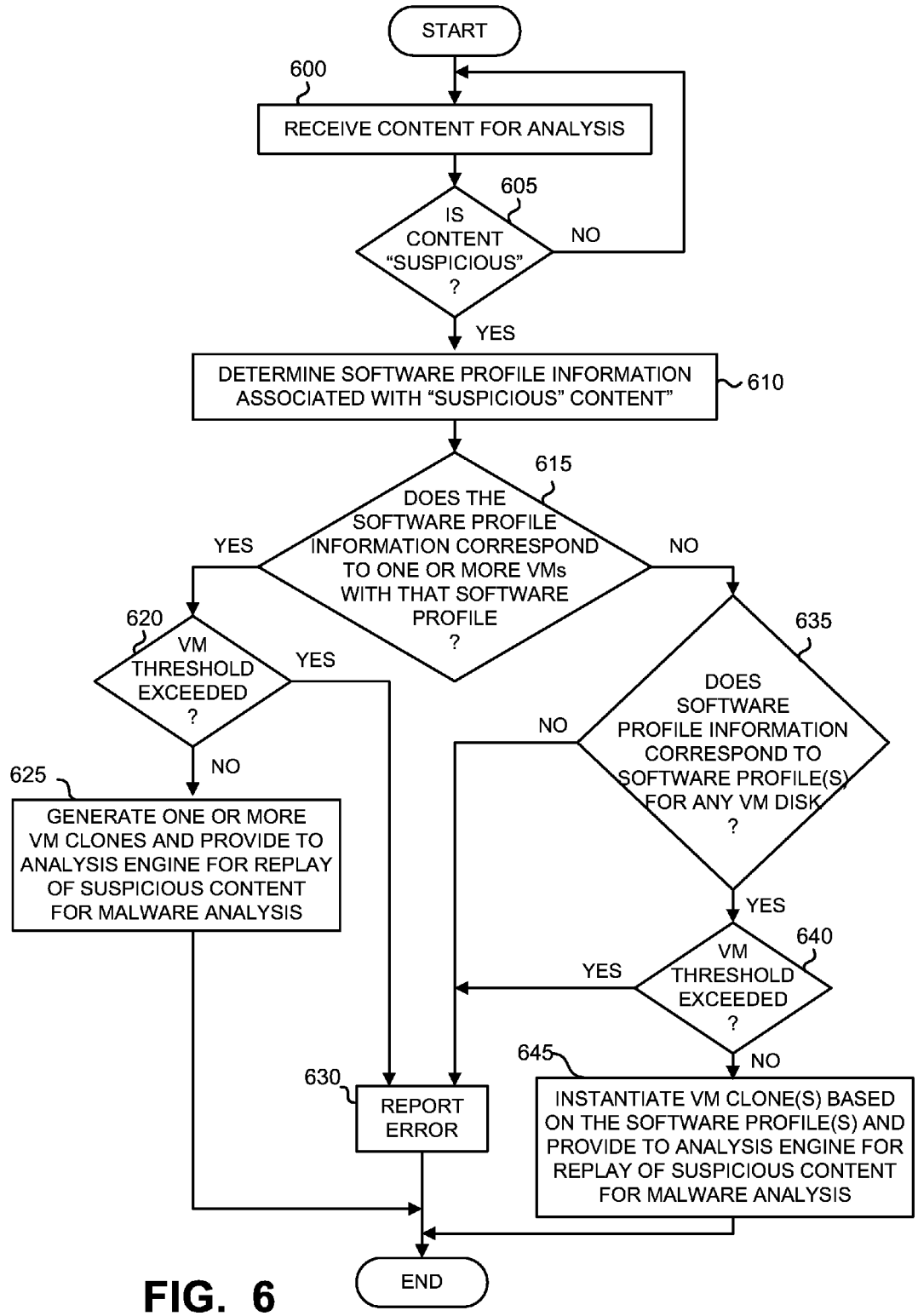
FIG. 6 is an exemplary embodiment an exemplary diagram of a flowchart partially illustrating operations for instantiating a VM clone.

Referring to FIG. 6, an exemplary diagram of a flowchart partially illustrating operations for instantiating a VM clone is shown. Prior to conducting the malware detection analysis, ingress content is received by the MCD system (block 600). Upon determining that this content constitutes "suspicious" content (block 605), the software profile information associated with the operating environment targeted for the ingress suspicious content (e.g., OS type/version, application type(s)/version(s), virtual devices) is determined (block 610). According to one embodiment of the disclosure, the software profile information may be determined by analysis of the payload for data packets formulating the suspicious content. Alternatively, the software profile information may be obtained from the browser signature, or the like.

Thereafter, a determination is made whether there is at least one VM disk supporting a software profile corresponding to the determined software profile information (block 615). If so, one or more VM clones based on the software profile may be provisioned by VM provisioning logic (block 620), provided that the VM threshold is not reached (block 625). If the VM threshold is reached, the VM clone is not provisioned (a warning or error report message may be generated by display by the user/administrator) and the content may be temporarily buffered until the number of provisioned VM clones falls below the VM threshold (block 630).

However, if there is no VM disk supporting the particular software profile, a secondary determination is made as to whether the software profile information includes information that is correlated to software profile by one or more of the VM disk files (block 635). For instance, according to one embodiment of the disclosure, software profile information is correlated to software profiles in one or more of the VM disks if at least an OS and version number identified in the software profile information matches a software profile within the VM disk file(s). According to other embodiment of the disclosure, the software profile information corresponds to a software profiles if the software profile information includes (i) an OS identified in the software profile within one of the VM disk files independent of version type; (ii) an OS identified in the software profile within one of the VM disk files along with requisite applications regardless of version type; (iii) an OS identified in the software profile within one of the VM disk files along with applications having the same functionality as requisite applications. The correspondence level needed may be set by an administrator/user.

If the OS is not provided and/or there is no support for the identified OS, an error report may be provided to the user/administrator (block 630). However, if the secondary determination detects that the OS is supported by the MCD system for example, VM clones may be generated for all of the software profiles directed to this particular OS type, provided that the VM threshold is not reached (blocks 640-645). The VM threshold may be computed in a variety of ways. If the VM threshold is exceeded, an error report is generated (block 630). Otherwise, the VM clones are generated and supplied to the analysis engine where one of the VM clones will be executed as part of the replay logic.

As an example, the VM threshold may be computed by analyzing the amount of memory allocated for VM operations (e.g. 20 GB) divided by (a) the sum of first predetermined memory sizes (e.g., 1 GB) allocated for each VM clone associated with a different software profile and (b) a sum of second predetermined memory sizes (e.g., 100 MB) for each additional VM clone associated with one of the software profiles of (a). As an illustration, the MCD system could support twenty (20) VM clones each associated with a different software profile; ten (10) VM clones associated with different software profiles and 100 additional VM clones associated with these different software profiles; or five (5) VM clones associated with different software profiles and 150 additional VM clones associated with these different software profiles.

Figure 7A:
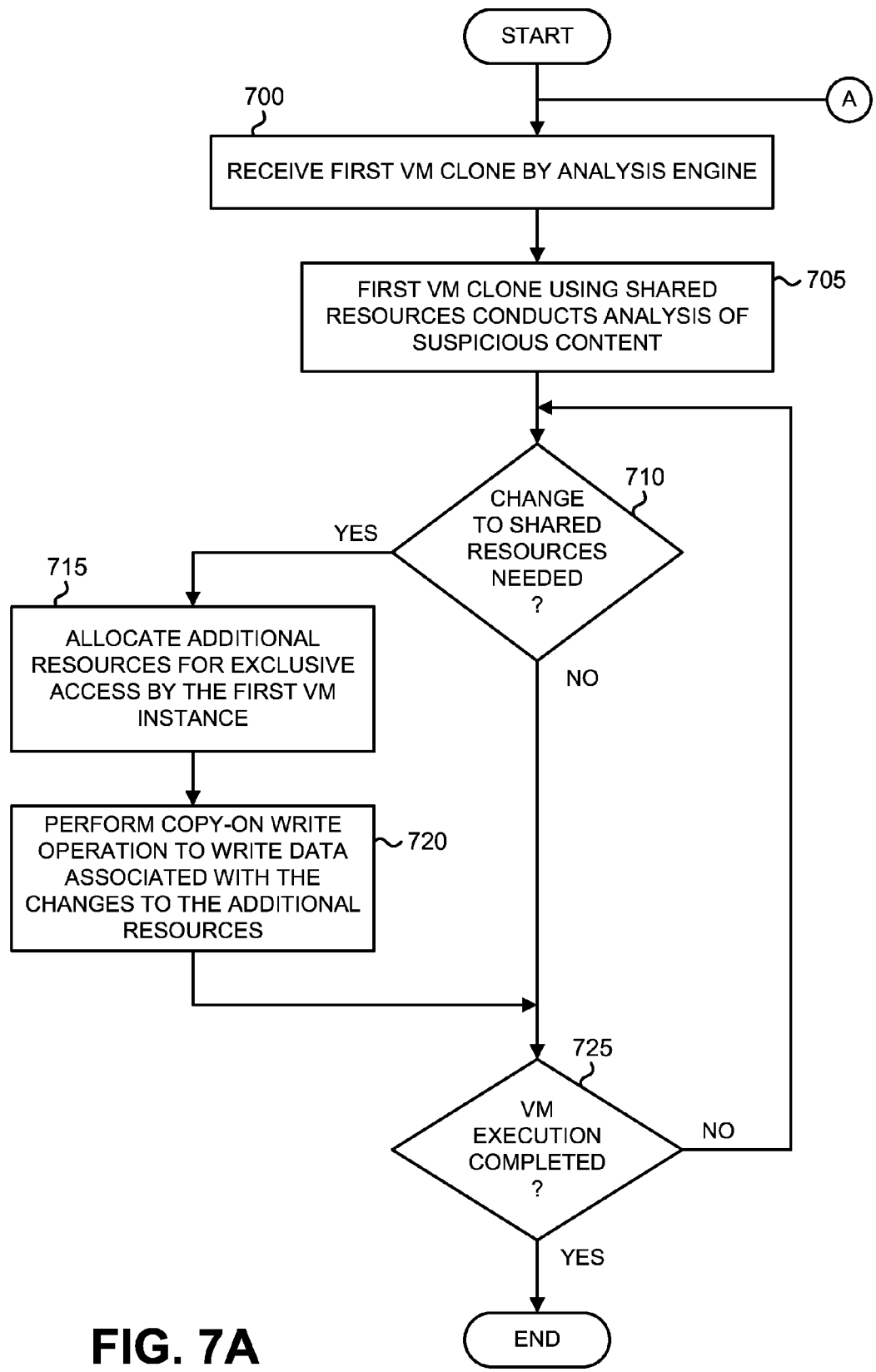
FIGS. 7A-7B are exemplary flowcharts directed to Copy-On Write operations concurrently conducted by multiple VM clones.
Figure 7B:
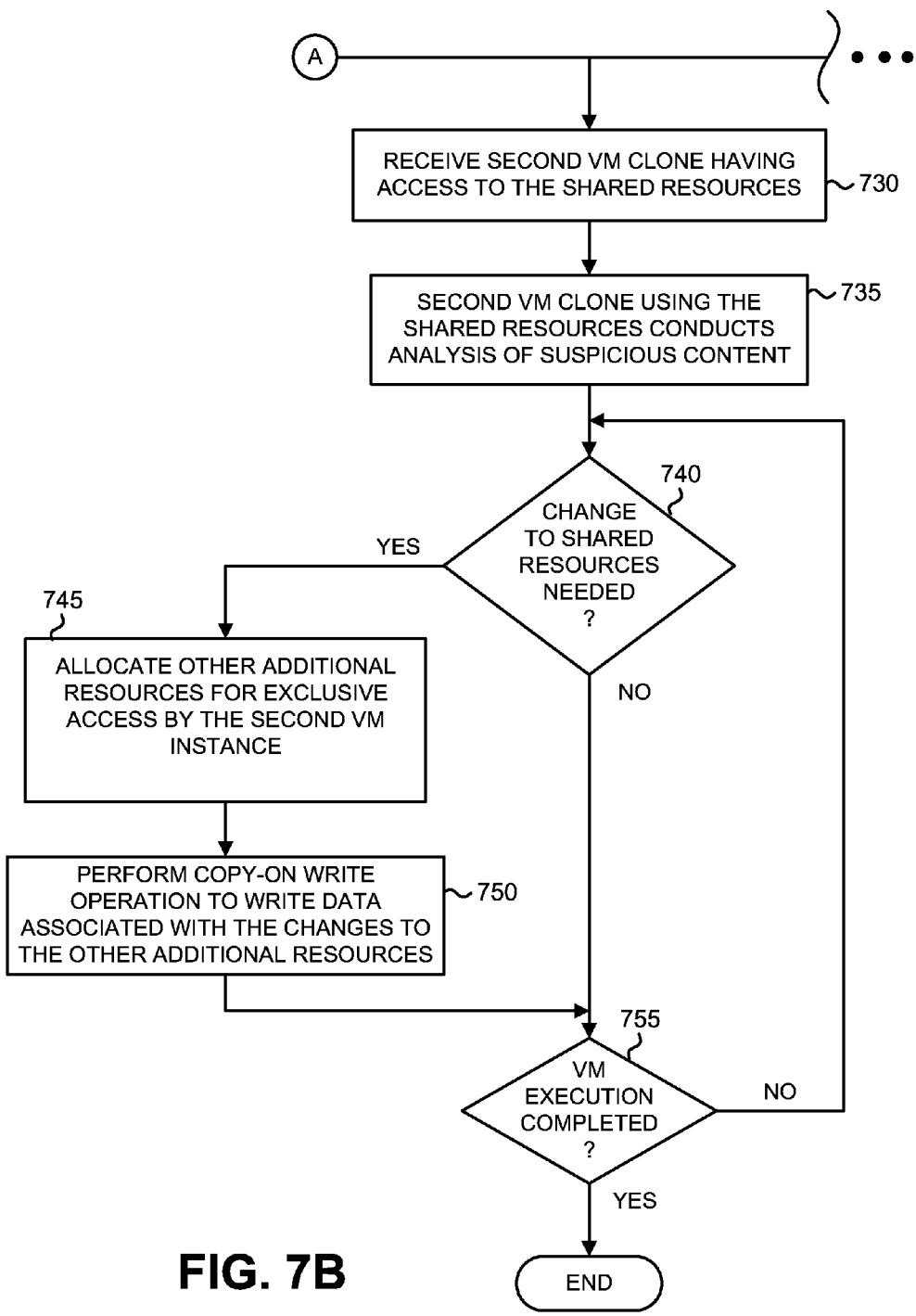

Referring now to FIGS. 7A-7B, exemplary flowcharts directed to Copy-On Write operations concurrently conducted by multiple VM clones is shown. Upon receiving a first VM clone by the analysis engine, the first VM clone is loaded into the replay logic and executed to analyze suspicious content that caused instantiation of the first VM clone (blocks 700 and 705). The analysis is conducted in order to detect undesired behavior caused by malware within the suspicious content.

During execution of the first VM clone, in response to a write operation that would alter data within one or more memory pages of the shared resources, the VM resource logic allocates additional resources for receipt of the data to be written (blocks 710 and 715). Thereafter, the first VM clone performs a Copy-On Write (COW) operation to store the data to be written within the additional resources (block 720). Now, given slightly different functionality (e.g., access to the shared resources except for above-described one or more memory pages), the first VM clone is now referred to as a first VM instance. The first VM instance has exclusive access to the additional resources storing the written data. If the first VM clone (instance) has not completed execution and analysis of the suspicious content, the VM resource logic continues to allocate additional resources for use by the first VM clone (instance) as needed (block 725).

Concurrently with operations performed by the first VM clone, as denoted by label "A" and shown in FIG. 7B, the analysis engine receives a second VM clone, which is also loaded into the replay logic and executed to analyze suspicious content (blocks 730 and 735). The second VM clone is directed to the same software profile as the first VM clone, and the suspicious content may be extracted from a different data flow than the suspicious content analyzed by the first VM clone.

During execution of the second VM clone, in response to a write operation that would also alter data within one or more memory pages of the shared resources, the VM resource logic allocates other additional resources for receipt of the data to be written (blocks 740 and 745). Thereafter, the first VM clone performs a Copy-On Write (COW) operation to store the data to be written within the other additional resources (block 750). Now having functionality different from its instantiated state (e.g., access to the shared resources except for the noted memory page(s)), the second VM clone is now referred to as a second VM instance.

Hereafter, the second VM instance has exclusive access to the other additional resources storing the written data. If the second VM clone (instance) has not completed execution and analysis of the suspicious content, the VM resource logic continues to allocate additional resources for use by the second VM clone (instance) as needed (block 755). The process may continue for additional VM clones based on the same software profile as used for instantiation of the first VM clone and the second VM clone.

In the foregoing description, the invention is described with reference to specific exemplary embodiments thereof. It will, however, be evident that various modifications and changes may be made thereto without departing from the broader spirit and scope of the invention as set forth in the appended claims. For instance, in lieu of or in addition to the MCD system $110_1$-$110_3$ of FIG. 1, a malware analysis described above may be conducted within firewall or other components within the communication network that is adapted to conduct dynamic malware analysis through the optimized use of VMs.

Also, one of the embodiments of the invention may be directed to a computerized method comprising (1) instantiating, by the controller, a first virtual machine instance for which resources are allocated, the first virtual machine instance to provide a first virtual operating environment; and (2) instantiating, by the controller, a second virtual machine instance running concurrently with the first virtual machine instance, the second virtual machine instance sharing the resources allocated to the first virtual machine instance and being allocated additional resources upon conducting a Copy-On Write operation. The first virtual machine instance may be based on a first software profile, where the first software profile includes information used for virtualization of the first virtual execution environment (e.g., a specific version of an operating system being executed by the first virtual machine instance; information associated with a specific version of an application being executed by the first virtual machine instance; etc.). The second virtual machine instance may be based on the first software profile and may be instantiated while the first virtual machine instance is running.

According to this embodiment, the first virtual machine instance may be configured for analyzing whether content from a first data flow targeted to operate on a client device having the first software profile has malware and the second virtual machine instance may be configured for analyzing whether content from a second data flow targeted to operate on the client device and different from the first data flow has malware.

After instantiation of a plurality of virtual machine instances including the first virtual machine instance and the second virtual machine instances, the computerized method may further comprise (1) determining whether instantiation of a third virtual machine instance exceeds a threshold, where the threshold represents a predetermined number of concurrently operating virtual machine instances, and (2) instantiating the third virtual machine instance if a sum of the plurality of virtual machine instances does not exceed the threshold or refraining from instantiating the third virtual machine instance if the sum of the plurality of virtual machine instances exceeds the threshold. The threshold may be equal to a first value when a first prescribed number of the plurality of virtual machine instances are virtual machine clones being virtual machine instances operating in an initial operating state upon creation. Alternatively, the threshold may be equal to a second value that is less than the first value when a second prescribed number of the plurality of virtual machine instances are virtual machine clones, where the second prescribed number is less than the first prescribed number.

Another one of the embodiments may include a non-transitory computer readable medium including software that, when executed by one or more hardware processors, performs operations comprising: (1) instantiating a first virtual machine instance for which resources are allocated, the first virtual machine instance to provide a first virtual operating environment; and (2) instantiating a second virtual machine instance running concurrently with the first virtual machine instance, the second virtual machine instance sharing the resources allocated to the first virtual machine instance and being allocated additional resources upon conducting a Copy-On Write operation.

Yet, another of these embodiments may include a malware content detection (MCD) system, which comprises: (1) a network port adapted to receive incoming content; (2) an analysis engine configured to analyze the incoming content in a virtual environment including one or more VM instances adapted to execute on a processor so as to process the incoming content in the virtual environment, each VM instance being associated with a software profile; (3) a VM provisioning logic configured to generate one or more VM clones and monitor the number of VM instances (including the VM clones) concurrently in use to assure the number does not exceed a threshold; and (4) a VM resource logic configured to allocate resources for each VM instance in response to a resource request.

For this MCD system, the VM resource logic comprises an allocation table configured to track allocation of resources to each of the VM instances. The VM resource logic is further configured to allocate the resources to each corresponding VM clone upon generation by the VM provisioning logic. As a result, each VM clone within the same VM family share the same allocated (VM) resources until such time as the VM clone seeks to modify such resources. Thereafter, if the VM clone seeks to modify any of the allocated resources, the VM clone is now considered to be a unique VM instance but remains within the VM family by continuing to share at least a portion of the allocated resources with other VM clone(s) and/or VM instance(s) within the VM family. The VM resource logic allocates an additional resource to the resultant VM instance to replace the resource that was sought to be modified, so as to enable the resultant VM instance to proceed with modifying the additional resource.

What is claimed is:

1. A computerized method for determining whether incoming content includes malware, comprising:
   determining software profile information associated with the incoming content;
   determining a first virtual machine instance operating with a first software profile that corresponds to the software profile information is currently running; and
   instantiating a second virtual machine instance operating with the first software profile to conduct malware analysis on the incoming content, wherein responsive to determining the first virtual machine instance is currently running and operating with the first software profile, the second virtual machine instance being provided access to first resources allocated for use by the first virtual machine instance; and
   responsive to an attempt by the second virtual machine instance to perform an operation that would alter the first resources, allocating second resources exclusively accessible by the second virtual machine instance.

2. The computerized method of claim 1, wherein the attempt to perform an operation that would alter the first resources includes conducting a Copy-On Write operation.

3. The computerized method of claim 1, wherein the second virtual machine instance operating concurrently with the first virtual machine instance.

4. The computerized method of claim 1, wherein the first software profile comprises a type of operating system corresponding to an operating system identified in the software profile information.

5. The computerized method of claim 4, wherein the first software profile further comprises one or more applications being executed by the first virtual machine instance that are identified in the software profile information.

6. The computerized method of claim 1 further comprising:
instantiating a third virtual machine instance that is based on a second software profile different from the first software profile, the third virtual machine instance being allocated resources that are not shared by the first virtual machine instance and the second virtual machine instance.

7. The computerized method of claim 1, further comprising:
after instantiation of a plurality of virtual machine instances including the first virtual machine instance and the second virtual machine instances, determining whether instantiation of a third virtual machine instance would exceed a threshold, the threshold representing a predetermined number of concurrently operating virtual machine instances; and
instantiating the third virtual machine instance if a sum of the plurality of virtual machine instances does not exceed the threshold; and
refraining from instantiating the third virtual machine instance if the sum of the plurality of virtual machine instances exceeds the threshold.

8. The computerized method of claim 7, wherein the threshold is equal to a first value when a first prescribed number of the plurality of virtual machine instances are virtual machine clones being virtual machine instances operating in an initial operating state upon creation.

9. The computerized method of claim 8, wherein the threshold is equal to a second value that is less than the first value when a second prescribed number of the plurality of virtual machine instances are virtual machine clones, the second prescribed number being less than the first prescribed number.

10. The computerized method of claim 8, wherein the resources include one or more memory pages within a system memory implemented within an electronic device.

11. The computerized method of claim 8, wherein the first software profile identifying the same version of an operating system and a different version of a particular application as the second software profile.

12. The computerized method of claim 8, wherein the first software profile identifies a first type of operating system and a first version of the first type of the operating system while the second software profile identifies the first type of operating system and a second version of the first type of the operating system, wherein the first version is different from the second version.

13. The computerized method of claim 1, wherein altering the resources allocated for use by the first virtual machine instance includes changing data within one or more memory pages of the first resources.

14. The computerized method of claim 1, wherein the first resources include one or more of system memory or virtual disk space.

15. A computerized method for determining whether incoming content includes malware, comprising:
determining software profile information associated with the incoming content;
instantiating a first set of virtual machine instances to conduct malware analysis on the incoming content, each virtual machine instance of the first set of virtual machine instances being placed into a first virtual operating state with shared access to a first resource;
instantiating a second set of virtual machine instances to conduct malware analysis on the incoming content, each virtual machine instance of the second set of virtual machine instances being placed into a second virtual operating state with access to a second resource different from the first resource; and
responsive to an attempt by a first virtual machine instance of the second set of virtual machine instances to perform an operation that would alter the second resource, allocating a third resource exclusively accessible by the first virtual machine instance of the second set of virtual machine instances, the third resource different from the first resource and the second resource.

16. The computerized method of claim 15, wherein the first set of virtual machine instances comprises two or more virtual machine instances each based on a first software profile.

17. The computerized method of claim 16, wherein the first software profile comprises a particular type of operating system.

18. The computerized method of claim 17, wherein the second set of virtual machine instances comprises one or more virtual machine instances based on a second software profile.

19. The computerized method of claim 17, wherein the attempt to perform an operation that would alter the second includes conducting a Copy-On Write operation.

20. The computerized method of claim 19, wherein the third resource comprises one or more areas of data storage different from the first resource and the second resource.

21. The computerized method of claim 15, wherein altering the first resource includes changing data within one or more memory pages of the first resource.

22. The computerized method of claim 15, wherein the first resource includes one or more of system memory or virtual disk space.

23. An electronic device for conducting an analysis for malware, comprising:
a network port adapted to receive incoming content; and
a controller coupled to the network port, the controller to:
(i) determine software profile information associated with the incoming content,
(ii) determine whether a first virtual machine instance operating with a first software profile that corresponds to the software profile information is currently running, the first virtual machine instance being allocated first resources to provide a first virtual execution environment at a prescribed virtual operating state,
(iii) instantiate a second virtual machine instance operating with the first software profile to conduct malware analysis on the incoming content, wherein responsive to determining the first virtual machine instance is currently running and operating with the first software profile, the second virtual machine instance being provided access to the first resources, and
(iv) responsive to an attempt by the second virtual machine instance to perform an operation that would alter the first resources, allocating second resources exclusively accessible by the second virtual machine instance.

24. The electronic device of claim 23, wherein the controller is configured to allocate the second resources exclusively accessible by the second virtual machine instance in response to the second virtual machine instance conducting a Copy-On Write operation.

25. The electronic device of claim 23, wherein the second virtual machine instance operating concurrently with the first virtual machine instance.

26. The electronic device of claim 23, wherein the first software profile comprises a type of operating system corresponding to an operating system identified in the software profile information and one or more applications being executed by the second virtual machine instance that are identified in the software profile information.

27. The electronic device of claim 23, wherein the controller is further configured to instantiate a third virtual machine instance that is based on a second software profile different from the first software profile, the third virtual machine instance being allocated resources that are not shared by the first virtual machine instance and the second virtual machine instance.

28. The electronic device of claim 23, wherein the controller is further configured, after instantiation of a plurality of virtual machine instances including the first virtual machine instance and the second virtual machine instances, to (i) determine whether instantiation of a third virtual machine instance would exceed a threshold, the threshold representing a predetermined number of concurrently operating virtual machine instances, and (ii) instantiating the third virtual machine instance if a sum of the plurality of virtual machine instances does not exceed the threshold or refraining from instantiating the third virtual machine instance if the sum of the plurality of virtual machine instances exceeds the threshold.

29. The electronic device of claim 28, wherein the threshold is equal to a first value when a first prescribed number of the plurality of virtual machine instances are virtual machine clones being virtual machine instances operating in an initial operating state upon creation.

30. The electronic device of claim 29, wherein the threshold is equal to a second value that is less than the first value when a second prescribed number of the plurality of virtual machine instances are virtual machine clones, the second prescribed number being less than the first prescribed number.

31. The electronic device of claim 23, wherein altering the first resources includes changing data within one or more memory pages of the first resource.

32. The electronic device of claim 23, wherein the first resources include one or more of system memory or virtual disk space.

33. A malware content detection system for conducting an analysis for malware, comprising:
a network port adapted to receive incoming content; and
a controller coupled to the network port, the controller to
(i) determine software profile information associated with the incoming content, (ii) instantiate a first virtual machine instance that is based on a first software profile corresponding to the software profile information being placed into an initial virtual operating state with access to a first resource allocated to be shared with other virtual machine instances that are based on the first software profile in order to conduct malware analysis on incoming content, and (iii) responsive to an attempt by the first virtual machine instance to perform an operation that would alter the first resource, allocate access to a second resource different from the first resource and exclusively accessible by the first virtual machine instance.

34. The malware detection system of claim 33, wherein altering the first resources includes changing data within one or more memory pages of the first resource.

35. The malware detection system of claim 33, wherein the first resources include one or more of system memory or virtual disk space.

* * * * *